United States Patent
Ramesh et al.

(10) Patent No.: US 12,255,776 B2
(45) Date of Patent: Mar. 18, 2025

(54) DYNAMIC RECONFIGURATION OF CONTROL-GROUP PAIRING IN RESPONSE TO OPERATIONAL FAILURE

(71) Applicant: Roku, Inc., San Jose, CA (US)

(72) Inventors: Sunil Ramesh, Cupertino, CA (US); Michael Cutter, Golden, CO (US); Karina Levitian, Austin, TX (US)

(73) Assignee: Roku, Inc., San Jose, CA (US)

( * ) Notice: Subject to any disclaimer, the term of this patent is extended or adjusted under 35 U.S.C. 154(b) by 7 days.

(21) Appl. No.: 18/060,447

(22) Filed: Nov. 30, 2022

(65) Prior Publication Data

US 2024/0179054 A1    May 30, 2024

(51) Int. Cl.
*H04L 41/0816* (2022.01)
*H04L 12/28* (2006.01)

(52) U.S. Cl.
CPC ...... *H04L 41/0816* (2013.01); *H04L 12/2816* (2013.01); *H04L 12/2823* (2013.01); *H04L 2012/2847* (2013.01); *H04L 2012/285* (2013.01)

(58) Field of Classification Search
CPC ............ H04L 41/0816; H04L 12/2816; H04L 12/2823; H04L 2012/2847; H04L 2012/285; H04L 12/2803; H04L 41/0661; H04L 41/0813; H04L 41/0886; H04L 69/40; F24F 11/54; H04W 24/04; H05B 47/155
See application file for complete search history.

(56) References Cited

U.S. PATENT DOCUMENTS

| | | | | |
|---|---|---|---|---|
| 10,101,716 | B2* | 10/2018 | Kim | H04L 41/0886 |
| 10,721,307 | B2* | 7/2020 | Moustafa | H04W 4/70 |
| 10,816,231 | B2* | 10/2020 | Warren | G01R 19/16533 |
| 10,895,396 | B2* | 1/2021 | Castillo | H04L 12/283 |
| 10,993,101 | B2* | 4/2021 | Macieira | H04W 52/0254 |
| 11,280,509 | B2* | 3/2022 | Sinha | G05B 15/02 |
| 11,360,447 | B2* | 6/2022 | Park | H04L 67/12 |
| 11,845,453 | B1* | 12/2023 | Katzourakis | B60W 10/18 |
| 2021/0297279 | A1* | 9/2021 | Pognant | H04L 41/0846 |
| 2022/0080935 | A1* | 3/2022 | Terada | B60T 8/92 |
| 2023/0120453 | A1* | 4/2023 | Rao | H04L 12/2825 340/4.3 |

OTHER PUBLICATIONS

Michael Norris, Berkay Celik, Patrick McDaniel, Gang Tan, Prasanna Venkatesh, Shulin Zhao, & Anand Sivasubramaniam. (2020). IoTRepair: Systematically Addressing Device Faults in Commodity IoT (Extended Paper). (Year: 2020).*

* cited by examiner

*Primary Examiner* — Alex H. Tran
(74) *Attorney, Agent, or Firm* — McDonnell Boehnen Hulbert & Berghoff LLP

(57) ABSTRACT

A method and system for dynamically reconfiguring control pairing in a system comprising a controlling device, a first controlled device, and a second controlled device. An example method includes, when the controlling device is set to control state of the first controlled device, a processor determining that the first controlled device has experienced an operational failure. Further, the example method includes, responsive to the determining, the processor engaging in dynamic reconfiguration of the system, the dynamic reconfiguration causing the controlling device to control state of a second device instead of or in addition to the controlling device controlling state of the first controlled device.

20 Claims, 5 Drawing Sheets

DYNAMIC RECONFIGURATION OF CONTROL-GROUP PAIRING IN RESPONSE TO OPERATIONAL FAILURE

SUMMARY

Modern customer premises, such as homes, hotels, or offices, are increasingly equipped with many devices that are configured to engage in digital communications. These devices may range from traditional internet-connected equipment such as personal computers, telephone systems, security systems, gaming systems, and over-the-top (OTT) streaming media players, to newer equipment including "smart home" devices such as connected appliances, utilities, lights, switches, power outlets, and speakers, as well as wearable devices such as watches and/or health monitors, among countless other examples.

A home or other customer premises could contain a collection of devices that can be dynamically configured to communicate with each other in order to carry out useful functions. These devices could function statically or dynamically as sensors, controlling devices (e.g., controls), and controlled devices, among other possibilities. Without limitation, for instance, sensors could include devices for sensing environmental state such as motion, vibration, water, temperature, smoke, heat, pressure, wind, or the like. Controlling devices could include devices for controlling other devices and could possibly include user input mechanisms such as switches, buttons, knobs, microphones, or the like, to facilitate the controlling. And controlled devices could include devices that could be controlled by controlling devices, such as power outlets, lightbulbs, fans, speakers, appliances, furniture, or the like.

Further, the devices of the collection may include a central hub device that helps to coordinate operations of and inter-operations between the devices. For instance, a central hub device may be programmed with logic to receive a control command from a controlling device and to respond to that control command by in turn transmitting one or more associated control commands to one or more controlled devices, to control state of the one or more controlled devices. Alternatively, there may be no central hub, and the devices of the collection may possess distributed state, netlist, and control logic information to facilitate their independent operation and interoperation. The devices of the collection may thus be programmed with logic to take action without guidance or assistance from a central hub.

Some of the devices may also be combinations of various types. For instance, a given device may function as both a controlling device and a controlled device, by being configured to control itself or being configured to be controlled by another device and to control another device. Further, some of the devices may carry out other functions, such as repeating signals between other devices and/or downloading device logic, among other possibilities, and may or may not also function as sensors, controlling devices, controlled devices, and/or other types of devices.

Some of these devices could be logically divided into control groups, which may or may not be mutually exclusive (i.e., may or may not share at least one device in common). Without limitation, an example such control group may consist of devices that are physically co-located with each other, such as devices in a given room or living area. Each control group could define one or more functional interrelationships between its included devices. For example, a control group containing a switch and a lightbulb may define a functional interrelationship between the switch and the lightbulb, establishing that the switch controls the on/off/dimming state of the lightbulb. As another example, a control group containing a motion sensor, a switch, and a lightbulb may define a functional interrelationship between the motion sensor and the switch, establishing that the motion sensor would send a trigger message to the switch upon detecting motion, and may further define a functional interrelationship between the switch and the lightbulb, establishing that the switch controls the state of the lightbulb. Numerous other control groups and functional interrelationships could be possible as well.

There may or may not also be a router or the like that manages or facilitates communication between these devices. The devices may be capable of engaging in direct or mesh network communication with each other without a need for a router or the like. For instance, the devices could be arranged with soft-wiring rather than fixed inter-device connections, which may enable devices to be added and removed on the fly.

In an example arrangement, the devices of the collection may maintain and share with each other a set of operational data, including state, netlist, and control logic for instance.

For example, devices within a given control group may share with each other, and with a central hub if provided, a set of operational data pertinent to the control group. For a control group G1 consisting of a switch S1 and a lightbulb L1, with S1 set to control L1, for instance, this operational data may include (i) state information defining the on/off/dim state of L1, (ii) netlist information defining the identifiers (e.g., network addresses) and interrelationship between S1 and L1, and (iii) control logic executable by S1 to carry out switch operations and control logic executable by L1 to carry out lightbulb operations.

Whenever this control group's set of operational data changes, optimally each device in the control group could be updated to reflect the changed operational data, so that each device in the control group would maintain an up-to-date copy of the control group's set of operational data. Further, if the collection includes a central hub, the central hub could also be updated to reflect the changed operational data, so that the central hub would also maintain an up-to-date copy of the control group's set of operational data.

For example, if the on/off/dim state of L1 changes, L1 may report its new state to S1 and to the central hub, or S1 and the central hub may otherwise learn of that updated state, so that L1, S1, and the central hub may thus all have a record of that updated state. As another example, if S1 receives or otherwise experiences a change of control logic, S1 may report that changed control logic to L1 and to the central hub, or L1 and the central hub may otherwise learn of that changed control logic, so that S1, L1, and the central hub may thus all have a record of S1's updated control logic. And as yet another example, if a new device gets added to the control group, netlist data stored by S1, L1, and the central hub could get updated accordingly, and the new device could receive and store the operational data of the control group as well.

Further, control groups could share their operational data with each other, so that devices in one control group may store not only operational data that is pertinent to their own control group but also operational data that is not pertinent to their own control group but that is pertinent to each of one or more other control groups. For instance, given two control groups G1 and G2, with group G1 consisting of a first switch S1 and a first lightbulb L1, and group G2 consisting of a second switch S2 and a second lightbulb L2, group G1 and group G2 could share their respective operational data with each other. Namely, the devices of group G1 may store not only the operational data of group G1 but also the operational data of group G2, and the devices of group G2 may store not only the operational data of group G2 but also the operational data of group G1.

With this arrangement, whenever the operational data of either such control group changes, not only would the devices of that control group be updated to reflect the changes, but the devices of the other control group could be updated to reflect the changes as well, so that both control groups would have an up-to-date record of its own operational data and of the other control group's operational data. For example, when S1 changes the on/off/dim state of L1, not only would S1 and L1 both record that updated state, but S1 and/or L1 may also report the change of state to S2 and L2, or S2 and L2 may otherwise learn of that updated state, so that both control groups would have a record of their own operational state and the operational state of the other control group.

This sharing of operational data among devices of the collection of devices could offer a number of advantages. Without limitation, for instance, this arrangement could facilitate quick and convenient restoration of operational data after devices or control groups have experienced a loss-of-connectivity event, an out-of-service event, or another failure event. For instance, with the two example groups noted above, if the devices of group G1 lose power and/or otherwise lose their records of operational data, once they come back online, they could engage in a discovery process, broadcasting probe messages or the like to which one or more devices in group G2 may respond by providing the latest operational data including operational data pertinent to group G1, and the devices of G1 could thus receive and store that operational data and continue operating like they were before they experienced the failure event. Other examples are possible as well.

In a system such as this, control group pairings defining functional interrelationships between controlling devices and controlled devices could be statically defined. For instance, a given controlling device could be set statically to control a given controlled device or set of controlled devices. This may be the case particularly for a simple controlling device such as a switch or button. The system could be set with static pairing between that simple controlling device and a particular controlled device or set of controlled devices, so that the system would respond to a user engaging of that simple controlling device by adjusting the state of the statically-associated controlled device(s). For instance, the system may be set with static pairing between a switch and a lightbulb or group of lightbulbs, so that the system would respond to user engaging of that switch by toggling the on/off state of that particular lightbulb or group of lightbulbs.

However, static pairing of a controlling device with controlled device(s) could be limiting. One example scenario where a static pairing could be limiting is where a controlled device experiences an operational failure, such that when the controlling device would seek to control the controlling device, that effort would fail.

By way of example, in a system where a switch is set to control a given lightbulb but where that lightbulb has experienced an operational failure (e.g., has burnt out, experienced significant luminous decay, or lost the ability to engage in signaling communication), an effort by the switch to turn on the lightbulb (e.g., to turn on the lightbulb to full brightness) may fail. Although the switch may transmit a control command to turn on the lightbulb, for instance, the lightbulb may not turn on at all or may not turn on to the extent desired.

As another example, in a system where a switch is set to turn on an air-conditioning unit but where that air-conditioning unit has experienced an operational failure (e.g., has lost the ability to output cool air, or has lost the ability to engage in signaling communication), an effort by the switch to turn on the air-conditioning unit may fail. Although the switch may output a control signal to turn on the air-conditioning unit, for instance, the air-conditioning unit may not turn on or may not output cool air to the extent desired. Other examples, not limited to switches and turning devices on, are possible as well.

Disclosed herein is a technological advance to help address this issue. In accordance with the disclosure, in a system where a controlling device is set to control state of a first controlled device, a processor will detect that the first controlled device has experienced an operational failure, and the processor will responsively reconfigure the system to cause the controlling device to control state of a second controlled device instead of or in addition to controlling state of the first controlled device.

For example, if the system is configured to have a switch control the on/off state of a first lightbulb, the processor may detect that the first lightbulb has experienced an operational failure, and the processor may responsively reconfigure the system to have the switch instead control the on/off state of a second lightbulb instead of or in addition to controlling the on/off state of the first lightbulb. As another example, if the system is configured to have a switch control the on/off state of an air-conditioning unit, the processor may detect that the air-conditioning unit has experienced an operational failure, and the processor may responsively reconfigure the system to have the switch instead control the on/off state of a fan instead of or in addition to controlling the on/off state of the first air-conditioning unit.

This dynamic reconfiguration of the system could be carried out one by or more entities, such as but not limited to the controlling device, the first controlled device, and/or a central hub. Further, to facilitate this reconfiguration, the processor could have access to data that designates the second controlled device as a secondary device to be controlled when the first controlled device has experienced an operational failure.

These as well as other aspects, advantages and alternatives will become apparent from reading the following detailed description with reference where appropriate to the accompanying drawings. Further, it should be understood that the implementations described in this summary and in the following description and drawings are intended as examples only and that numerous variations could be possible.

DETAILED DESCRIPTION

Example implementations will now be described in the context of example customer premises such as a home. It will be understood, however, that the disclosed principles could apply as well with respect to other customer premises, including without limitation any facility where people might reside, work, visit, or otherwise be present, among other possibilities.

It will also be understood that the arrangements and processes described could take various other forms. For instance, elements and operations could be re-ordered, distributed, replicated, combined, omitted, added, or otherwise modified. In addition, elements described as functional entities could be implemented as discrete or distributed components or in conjunction with other components/modules, and in any suitable combination and location. Further, various operations described as being carried out by one or more entities could be implemented by and/or on behalf of those entities, through hardware, firmware, and/or software, such as by one or more processing units executing program instructions stored in memory, among other possibilities.

Example Multi-Device System

Figure 1:
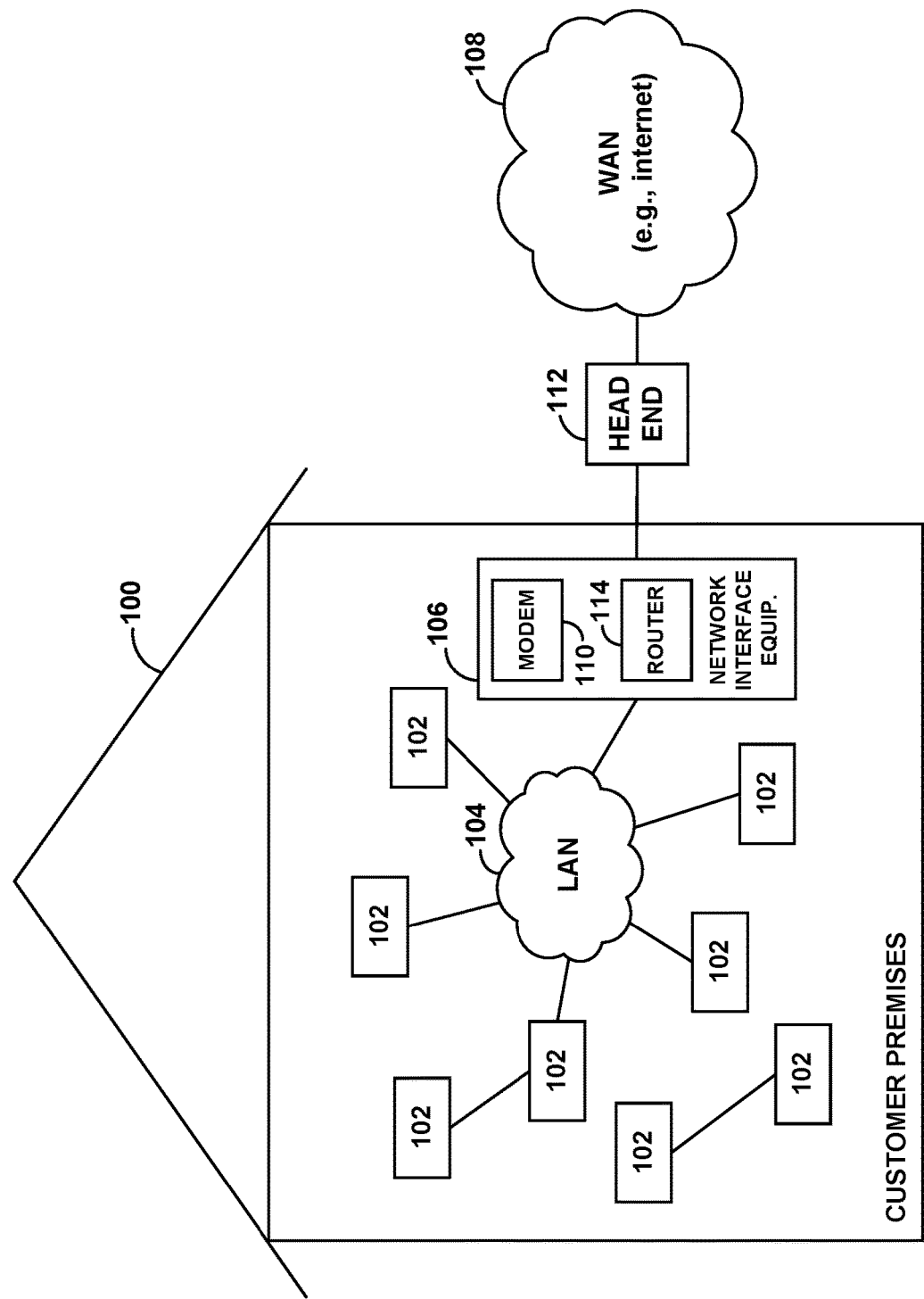
FIG. 1 is a simplified block diagram illustrating an example arrangement in which disclosed principles could be implemented.

Referring to the drawings, as noted above, FIG. 1 is a simplified block diagram illustrating an example arrangement in which various disclosed principles could be implemented. As shown in FIG. 1, the example arrangement includes, at example customer premises 100, a collection of multiple devices 102 that could be configured to operate as described herein. In a scenario where the customer premises 100 comprises a house or another structure, one or more of these devices 102 could be located physically within that structure, and/or one or more of the devices 102 could be located outside of the structure, such as in an adjoining or nearby area for instance.

To facilitate operations such as those noted above, the devices 102 of the collection could be configured to communicate with each other. This communication could occur in any of a variety of ways, through wireless and/or wired physical connections, and through direct peer-to-peer connections and/or network connections. Further, the communication could make use of soft-wiring, enabling devices to be added and removed on the fly, without the need for statically defined connections between each other.

Without limitation, for instance, FIG. 1 shows some of the devices 102 sitting as nodes on a local area network (LAN) 104. LAN 104 could be a centralized network having a router 106 to manage device connections and routing of data, or LAN 104 could be a decentralized network (e.g., a wireless ad-hoc network), which may be self-configuring as devices enter or leave the network, and in which routing of data may occur more dynamically based on network connections and routing algorithms. Alternatively or additionally, as further shown, some of the devices 102 may have direct rather than networked connections with each other.

To support this or other such inter-device communication, each device 102 of the collection could include one or more communication modules and associated communication logic. For instance, each device 102 could include a wireless communication module, such as a WiFi, BLUETOOTH, or ZIGBEE module, and/or a wired communication module such as an Ethernet or Powerline network adapter, and could include a processor programmed with an associated communication stack and/or other logic that governs its communications.

Through manual or automated processes using these modules, the devices 102 may acquire connectivity that would allow them to then engage in direct or indirect communication with each other. For instance, the devices 102 may broadcast signals advertising their presence and may likewise discover presence of other devices 102 and/or network infrastructure, and the devices 102 may engage in control signaling to establish direct pairings with other devices 102 and/or to obtain network address assignments that allow them to engage in network communication with each other. Further, some manual setup may be involved in establishing these or other device connections.

FIG. 1 also illustrates the example customer premises 100 including network interface equipment 106 that provides the customer premises 100 with a connection that may enable one or more of the devices 102 to communicate on a wide area network (WAN) 108 such as the internet. In an example implementation, the network interface equipment 106 could include a cable, satellite, cellular, or other WAN modem 110 configured to connect with an associated head end (e.g., cable or satellite head end or cellular core network) 112 that provides WAN connectivity, and could further include a router 114 that may manage communications between various devices 102 and enable various devices 102 to communicate on the WAN 108.

With this example arrangement, when the WAN modem 110 is initially powered on, the modem 110 may register its presence with the head end 112, and the head end 112 may assign to the modem 110 a globally-routable Internet Protocol (IP) address for use to engage in communications on the WAN 108, or the modem 110 may have a statically-assigned globally-routable IP address. Further, as a device 102 initially powers on, the device 102 may register its presence with the router 114, and the router 114 may assign to the device a locally-routable IP address for use to engage in communication on the LAN 104, or the device may have a statically-assigned locally-routable IP address. The device 102 may then engage in WAN communications through the router 114, modem 110, and WAN connection, with the router performing standard network address translation between the device's local IP address and the modem's global IP address.

Figure 2:
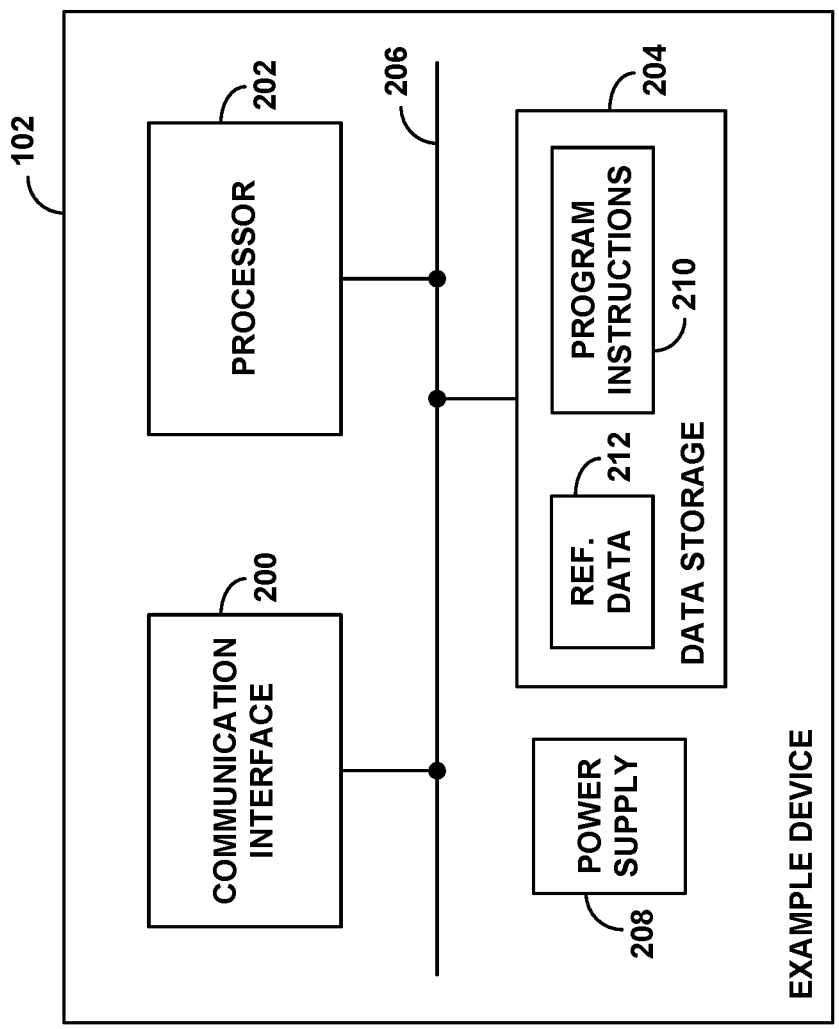
FIG. 2 is a simplified block diagram illustrating example components of an example device.

FIG. 2 is a simplified block diagram illustrating components of an example device 102. As shown in FIG. 2, the example device 102 includes a communication interface 200, a processor 202, data storage 204, all of which may be communicatively linked together by a system bus, network, or other connection mechanism 206 and/or integrated together in various ways. Further, the example device 102 includes a power supply 208, such as a direct or alternating current input or battery, which could supply power to drive various other components of the device 102. Depending on its type, the device may take other forms and may other components.

In the example device 102, the communication interface 200 could include one or more communication modules such as wireless and/or wired interfaces and associated logic to facilitate communication with other devices in the collection, and, if applicable, to facilitate communication on the WAN 108, in accordance with any of various communication protocols. For instance, the communication interface 200 could include one or more wireless communication modules with one or more associated antennas, and/or one or more wired Ethernet modules.

The processor 202 could comprise one or more general purpose processors (e.g., microprocessors) and/or one or more special purpose processors (e.g., application specific integrated circuits). Further, the data storage 204 could comprise one or more non-transitory storage components, such as optical, flash, magnetic, RAM, ROM, or other storage, possibly integrated in whole or in part with the processor 202. As shown, the data storage could hold or be configured to hold program instructions 210 and reference data 212. The program instructions 210 could define or constitute controller code, which could be executable or interpretable by the processor 202 to cause the device 102 to carry out various device operations described here. And the reference data 212 could include data useable by the device 102 to facilitate carrying out various operations. For instance, the reference data could include some of the operational data noted above, among other possibilities.

The devices 102 of the collection may be of various types, including but not limited to sensors, controlling devices, controlled devices, a central hub, and other devices such as repeaters and advanced user-interface devices including personal computers, mobile phones, tablets, smart watches, wearable devices, gaming devices, and OTT devices, for instance. Further, some devices 102 may be of multiple types. For instance, a device may function as both a controlled device and a repeater, as both a sensor and a controlling device, as a controlling device, controlled device, and central hub, as both an OTT device and a central hub, or as both an OTT device and a controlling device, among other possibilities.

Sensors could function to sense state. As noted above, for instance, sensors could include devices for sensing motion, vibration, water, smoke, heat, pressure, wind, or the like. Sensors could include known components that enable them to threshold state conditions and to trigger responsive action. For example, a sensor could be configured to sense when the level of motion, vibration, water, smoke, or other state in its environment reaches a predefined threshold level, and to responsively output a signal to a paired controlling device, to trigger associated action by the controlling device.

Controlling devices could function to control other devices and/or to take other control action. Controlling devices could include human-interface components, for receiving user input to trigger control action. For instance, a controlling device could include one or more switches, buttons, knobs, touch screens, microphones, or other components. Some such components could be configured to receive primitive user input such as the tapping or pressing of a button, the toggling of a switch, or the sliding of a slider, among other possibilities. Other such components could be configured to receive more complex user input, such voice input, parameter specifications, or the like. Further, controlling devices could be configured to receive input from sensors, indicating sensed state, and/or to detect or otherwise learn of context. And controlling devices could be configured to respond to such input, context, or the like, by engaging in control operations, such as outputting signaling to one or more controlled devices to change operational state or otherwise trigger controlled-device action.

Controlled devices could function to be controlled by controlling devices. As noted above, examples of controlled devices could include power outlets, lightbulbs, fans, speakers, or the like. Controlled devices could be configured to receive control signals from controlling devices and to respond to the control signals by changing their state. For instance, a power outlet may be configured to receive a control signal from a switch and to respond to the control signal by toggling between outputting power or not. As another example, a lightbulb may be configured to receive a control signal from a switch and to respond to the control signal by toggling between on and off state, changing the brightness or color of its emitted light, and/or taking one or more other actions indicated by the control signal, among other possibilities.

OTT devices could function to facilitate OTT media services. Without limitation, an OTT device could be an OTT streaming media player, which could be integrated or connected with a display such as a television and could interwork with various servers operated by an OTT provider (e.g., a virtual multichannel video programming distributor (virtual MVPD)), to facilitate receiving and playing of streaming media content. An OTT device may also be configured to receive from the OTT provider and to present on the display a graphical user interface (GUI) defining a menu of available streaming media channels, available content items, settings, and other options. Further, the OTT device may be configured to allow a user to navigate through the GUI (e.g., using a remote control) and to provide input that the OTT device could convey to the OTT provider to trigger actions such as controlling selection and streaming of media content.

A central hub could function as noted above to coordinate operations of various devices in the collection. For instance, a central hub could be programmed to receive control signal signals from controlling devices and to respond to the control signals by transmitting associated control signals to controlled devices. In particular, the central hub could include logic (e.g., mapping data) that defines control group pairings between controlling and controlled devices, such that when the central hub receives a particular control command from a particular controlling device, the central hub can determine what control action to take and can then engage in associated controlled signaling to cause that control action to be taken. For example, the central hub may be programmed with logic dictating that when the central hub receives a control command from a given switch, the central hub should respond to that control command by signaling in turn to a set of one or more lightbulbs to toggle the on/off state of each lightbulb in that set.

Each of these and/or other devices 102 at the customer premises 100 may have one or more identifiers that may uniquely identify the device among the collection of devices and that may facilitate communication among the devices. For instance, each device may have a permanent or semi-permanent hardware address, such as a Media Access Control (MAC) address or other identifier, and the devices may communicate with each other by addressing communications to their respective MAC addresses. Further or alternatively, each device may have a network address, such as a local IP address as noted above, and the devices may communicate with other by addressing communications to their respective network addresses.

Each device 102 may also have respective configuration and capability information, which the device may store in its data storage. This information may include, without limitation, the device's type, brand, model number, and various supported capabilities of the device. For example, if the device is a smart lightbulb made by a particular manufacturer, this information may include an indication that the device is a controlled device, an identity of its manufacturer, a model number the device, and specifications of capabilities such as ability to turn on off and to change light color and brightness, etc. A device may store this information as extensible markup language (XML) data, as a feature bit string, and/or in another form. It may also be possible to determine the configuration and capability information of a given device by a lookup keyed to an identifier of the device.

Further, as noted above, the devices 102 at the customer premises 100 could be grouped into control groups, which could define functional interrelationships between the devices, such as which devices will respond to and/or trigger action by which other devices (e.g., which sensors will provide sensed information to which controlling devices, which controlling devices will control which controlled devices, etc.), and how so. Each control group could consist of two or more devices, so there could be one or more functional interrelationships between the devices in a control group.

Each device in a control group, as well as any applicable central hub, could store control-group data for the control group as a whole, also perhaps as XML data and/or in another form. This control-group data could specify which devices are members of the control group and could define one or more interrelationships between the devices in the control group. For instance, the control-group data could include, respectively per device, control logic such as program instructions or scripting that defines how the device will interoperate with the one or more other devices of the control group. Further, the control-group data could specify the operational state of each of one or more devices in the control group, particularly of any device whose state could change from time to time.

For instance, consider a control group G1 that includes a motion sensor M1, a switch S1, and a lightbulb L1, where M1 is to notify S1 upon detecting a threshold motion, and S1 is to turn on L1 in response to primitive user input and/or in response to the notification from the M1. In that scenario, each device in group G1 may store an XML document that includes control-group data identifying the members of group G1 as M1, S1, and L1, that specifies for each group member a set of program logic useable respectively by the group member to carry out the operations that the group member is to carry out, and that specifies the on/off/dim state of L1. For example, the control-group data for group G1 could specify the hardware and/or network address respectively of each of M1, S1, and L1. Further, the control-group data could include (i) for M1, program logic executable by a processor of M1 to cause M1 to generate and transmit to S1 a notification signal upon detecting the threshold motion, (ii) for S1, program logic executable by a processor of S1 to cause S1 to transmit a control signal to L1 in response to the primitive user input and/or in response to the notification from M1, and (iii) for L1, program logic executable by a processor or L1 to cause L1 to respond to the control signal by transitioning from an off state to an on state, and also a record of the on/off/dim state of L1.

In an example implementation, the act of a controlling device controlling a controlled device could involve the controlling device generating and transmitting directly or through network communication to the controlled device a control signal to which the controlled device is configured to respond by engaging in an applicable action. For instance, turning on a lightbulb may involve transmitting from the controlling device to that lightbulb a control command to which the lightbulb is configured to respond by transitioning from an off state to an on state. Likewise, turning on an air-conditioning unit or fan my involve transmitting from the controlling device to the air-conditioning unit or fan a control command to which the air-conditioning unit or fan is configured to respond by transitioning from an off state to an on state.

Alternatively, the act of a controlling device controlling a controlled device could involve the controlling device generating and transmitting to a central hub a control command to which the central hub is configured to respond by transmitting to the controlled device a control command to which the controlled device is configured to respond by engaging in an applicable action. For instance, turning on a lightbulb may involve transmitting from the controlling device to the central hub a control command to which the central hub is configured to respond by transmitting to the lightbulb a control command to which the lightbulb is configured to respond by transitioning from an off state to an on state. And likewise, turning on an air-conditioning unit or fan may involve transmitting from the controlling device to the central hub a control command to which the central hub is configured to respond by transmitting to the air-conditioning unit or fan a control command to which the air-conditioning unit or fan is configured to respond by transitioning from an off state to an on state.

Provisioning Control-Group Pairings

The devices 102 at the customer premises 100 could be provisioned into control groups with associated interrelationships, through various processes, such as by user design, download of application logic, and/or manual pairing, among other possibilities.

Figure 3:
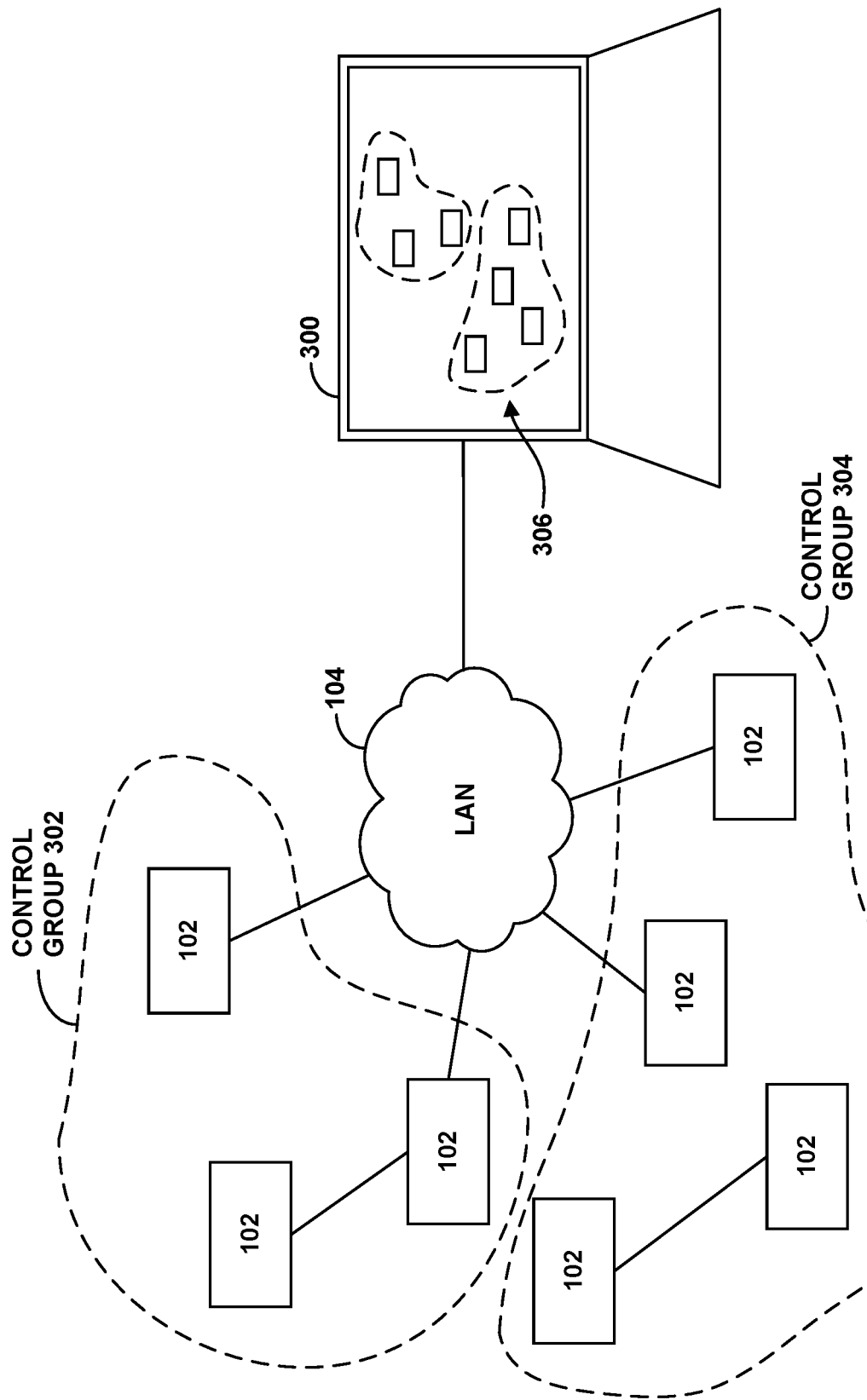
FIG. 3 is a simplified block diagram illustrating an example device provisioning system in example implementations.

In an example implementation, a personal computer, OTT device, or other computing system (which could be one of the devices 102 at the customer premises 100) could provide a user interface through which a user could provide input to define one or more such control groups. For instance, a personal computer at the customer premises 100 could execute a locally-stored configuration application or a browser-based configuration application, which could allow a user of the computer to define such control groups. FIG. 3 illustrates this arrangement by way of example, with a computer 300 that may be in LAN communication with the various devices 102 to define example control groups 302.

Executing this configuration application, the computer 300 may first discover the presence of each of various devices 102 at the customer premises, perhaps based on advertisements from the devices as discussed above, and may then present to the user a GUI 306 that lists or otherwise depicts the various devices 102 and allows the user to group the devices 102 into one or more control groups with associated inter-device interrelationships. The computer 300 may then receive user input specifying one or more desired groups of the devices 102 and, for each group, specifying desired functional interrelationships between devices in the group.

Once the computer 300 receives user input defining a given such control group, possibly then upon receipt of a user directive to send the control group data to the devices 102, the computer 300 may then provision the devices 102 of the control group with the associated control-group data. For instance, the computer 300 may generate and transmit to each such device a set of control-group data that defines the control group, and each recipient device may store that control-group data and then operate accordingly. Further, if a central hub is included and may be involved in control operations, the computer 300 may also transmit this set of control-group data to the central hub, and the central hub may likewise store the control-group data and then operate accordingly.

In executing the configuration application, the computer 300 may discover configuration and capabilities data of each of the devices 102 at the customer premises 100, by querying the devices and/or through lookups keyed to the devices' identifiers, among other possibilities. The computer 300 may then present to the user information about the configuration and capabilities respectively of each device, to assist the user in defining one or more control groups and functional interrelationships. Further, the computer 300 may limit device grouping and definitions of functional interrelationships based on this data. For instance, the computer may restrict grouping to devices of a common brand. Additionally or alternatively, the computer may restrict functional interrelationships based on device capabilities to control, to be controlled, or the like. In addition, the computer could suggest possible device groupings and functional interrelationships based on the configuration and capability data.

In another example implementation, a personal computer, OTT device, or other computing device (e.g., possibly one of the devices 102) could provide a user interface through which a user could download an IoT application from an online application marketplace, to facilitate associated provisioning the devices 102 with associated control-group data, using any online application marketplace system now known or later discovered.

In another example implementation, devices 102 at the customer premises could be provisioned through manual pairing into control groups with associated interrelationships. For instance, a user may manually pair a given switch with a given smart outlet by putting both the switch and smart outlet into a pairing mode in which the devices would engage in signaling with each other to discover each other's presence and establish a mutual control relationship. Through this process, the switch could become a controlling device for the outlet, configured to respond to primitive user input such as a button press by toggling the outlet between outputting power and not outputting power. Further, through this process, both the switch and outlet could establish and store associated control-group data that specifies the switch and outlet as members of a common control group and defines the functional interrelationship between the switch and the outlet. In this example, if either device is already a member of a control group, this process may involve that device responding to the pairing by updating the control-group data for the control group, to add the other device to the control group and to indicate the newly defined functional interrelationship, and updating a central hub if present.

As noted above, the devices in a control group could update each other and a central hub if provided, or the devices and central hub could otherwise be updated, when their control-group data changes. For instance, when a device detects a change to its stored control-group data, the device may generate and transmit to each other device in its control group and to the central hub an update message that provides each such other device and the central hub with an updated copy of the control-group data and/or information about the change. Each recipient device in the control group, as well as the central hub, may accordingly update its own copy of the control-group data to reflect any such changes.

Changes to the control-group data could take various forms, such as but not limited to changing the set of devices that make up the control group, changing the functional interrelationship between devices of the control group, and/or changing the state of a device in the control group.

Figure 4:
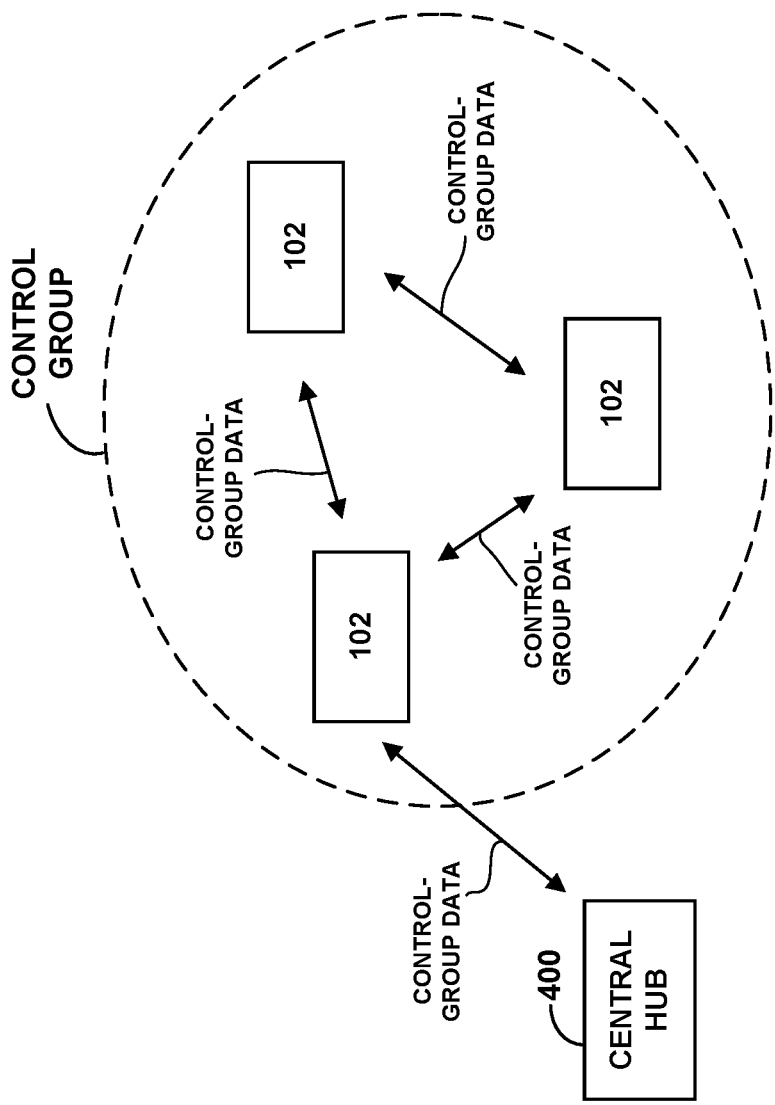
FIG. 4 is a simplified block diagram illustrating example sharing of control-group data among devices of a control group.

FIG. 4 illustrates an example of this process with a control group including three devices 102 and with a central hub 400. In this example, if the control-group data at one of the three devices 102 changes, that device may responsively signal to each other device 102 and to the central hub 400 to provide an updated copy of the control-group data, for storage by each recipient device and by the central hub 400. Alternatively, the device that detects the change may signal the change to one other device, which may in turn signal the change to the remaining devices and to the central hub, likewise for updating of the control-group data at each device.

As another example, consider the example control group G1 discussed above consisting of motion sensor M1, switch S1, and a first lightbulb L1, and assume that a second lightbulb L2 is added to the control group, to be controlled along with the first lightbulb L1 by switch S1 in response to primitive user input or motion sensing. For instance, assume that a user manually pairs S1 with L2 or adds L2 to the control group through a user interface as discussed above. When this happens, the control-group data in S1 may be updated to add L2 as an additional device in the control group, and S1 may respond to that change in its control-group data by updating the control-group data at each other member of the control group and at the central hub.

For instance, S1 could transmit to each of M1, L1, L2, and the central hub control signal that provides the updated control-group data for group G1, and each recipient device could store that control-group data as new control-group data for the group. Alternatively, S2 may transmit to each such device an indication of one or more incremental changes to make to already-stored control-group data. Through this or other processing, each device in the control group, and the central hub, could thus obtain and store as its control-group data for control group G1 a current set of control-group data that specifies as members of the control group M1, S1, L1, and L2, and that defines the functional interrelationships between these devices. Although this updated control-group data may not impact the operation of M1 and L1 in any way, M1 and L1 may still then be provisioned with the current control-group data for control group G1.

As another example, with example control group G1 consisting of motion sensor M1, switch S1, and lightbulb L1, when the state of L1 changes, the control-group data at each member of the control group, and at the central hub, could be updated accordingly, again even if updating the control-group data does not impact operation of a given such device.

For instance, the control-group data as stored at each of these devices may indicate that L1 is currently powered off. When S1 then turns on L1, both S1 and L1 may responsively update their copy of the control-group data to indicate that L1 is turned on. Further, S1 and/or L1 may respond to this change of state by signaling to M1 and to the central hub to update the control-group data at M1 and the central hub accordingly as well. For instance, both S1 and L1 may signal to M1 and to the central hub to provide M1 and the central hub with an updated copy of the control-group data indicating that L1 is turned on, or to provide M1 and the central hub with notification that L1 is turned on, and M1 and the central hub may accordingly revise their stored control-group data for group G1 to indicate that updated status.

Alternatively, if lightbulb L1 turns on through other means (e.g., by control of another switch or through other action), L1 may update its control-group data accordingly to indicate that L1 is turned on, and L1 may responsively signal directly or indirectly to the other members of the control group and to the central hub, to inform them of the change of state of L1 and to cause them to update their control-group data accordingly as well.

As noted above, synchronizing the control-group data among the members of a control group in this or another manner could beneficially enable restoring of the control-group data at a member of the control group after that member is intentionally or unintentionally taken out of service and/or otherwise loses its control-group data. For instance, if lightbulb L1 in the example control group G1 somehow loses its control-group data, motion sensor M1 and/or switch S1 could restore the control-group data in L1 by transmitting to L1 a copy of the most current control-group data for group G1 and having L1 store that data and proceed to operate accordingly.

To facilitate this, as noted above, when a device that was taken out of service comes back into service, the device may broadcast a probe message or the like to which one or more other devices could respond by providing the device with a copy of the latest control-group data for storage and use. Further, various members of the control group may engage in heartbeat signaling with each other and may use the heartbeat signaling as a basis to discover when other devices go out of service and come back into service. For instance, when a first device detects a threshold absence of heartbeat signaling from a second device, the first device may conclude that the second device has dropped out of service. When the first device then newly detects heartbeat signaling from the second device, the first device may conclude that the second device has come back into service. At that point, the first member may then responsively transmit to the second device a copy of the control-group data for storage and use by the second device.

Dynamic Reconfiguration in Response to Operational Failure

As further noted above, the functional interrelationship between devices at the customer premises can be reconfigured dynamically in response to an operational failure of a given device. This dynamic reconfiguration of functional interrelationships could involve changing various control-group pairings, such as but not limited to changing which controlled device a controlling device will control. Further, as noted above, this could be carried out at any of various devices in the system, such as but not limited to a controlling device, a controlled device, and a central hub.

An operational failure of a device could take various forms. By way of example, an operational failure of a device could involve the device losing an ability to carry out a device-specific function. For instance, an operational failure of a lightbulb could involve the lightbulb losing an ability to illuminate in an expected manner, which may happen if the lightbulb burns out or experiences significant luminous decay. Likewise, an operational failure of an air-conditioner could involve the air-conditioner losing an ability to cool air or to blow air. And an operational failure of an alarm could involve the alarm losing an ability to generate an audible or visual alert signal. Further, an operational failure of a device could involve the device losing an ability to engage in certain forms of communication. Other examples are possible as well.

In an example implementation, devices at the customer premises could be configured to determine (e.g., detect or otherwise learn) that a device has experienced an operational failure. Determining that a device has experienced an operational failure could involve determining that the device is in a operational-failure state, such that the device is currently not performing in an expected manner or is not able to perform in an expected manner. Further, determining that a device has experienced an operational failure could involve the device determining so itself or could involve another device determining so. For instance, devices of a given control group be configured to determine when any member of their control group has experienced an operational failure.

If a device has not stopped working altogether, the device may be configured to determine in various ways that it has itself experienced an operational failure. For instance, the processor 202 of a device may monitor one or more device-specific components or services of the device.

For example, an LED lightbulb may include circuitry and/or associated logic to detect its level of luminous decay over time and/or to detect if the lightbulb loses the ability to output light. Through application of this circuitry and/or logic, the processor 202 of such a lightbulb may be configured to determine that the lightbulb has experienced an operational failure in the form of the lightbulb having experienced a level of luminous decay that is at least as great as a predefined threshold (e.g., that the illumination capability of the lightbulb has degraded down to a predefined low percentage of its original capability) and/or the lightbulb having stopped emitting light altogether, among other possibilities.

As another example, an air-conditioning unit (e.g., a window, wall-mounted, or central air-conditioning system) may include circuitry and/or associated logic to monitor its level of air output possibly as a measure of its blower or fan strength for instance. Through application of this circuitry and/or logic, the processor 202 of such an air-conditioning unit may be configured to determine that the air-conditioning unit has experienced an operational failure in the form of the air-conditioning unit failing to output at least a predefined threshold level of air flow compared with an air-flow setting of the air-conditioning unit, and/or that the air-conditioning unit has stopped outputting air altogether, among other possibilities.

Alternatively or additionally, a device could determine that it has itself experienced an operational failure by being notified of the operational failure by one or more other devices that detect that the device has experienced the operational failure.

When a given device determines that it has itself experienced an operational failure, the given device may update its stored operational data accordingly and may report this updated state information to one or more other devices, which may also update their stored operational data. For instance, as discussed above, if the given device is a member of a control group, the given device may report this updated state information to each other member of the control group, and each other member of the control group may responsively update its stored operational data to indicate this operational-failure state of the given device. Further, if a central hub is involved, the given device may likewise report this updated state information to the central hub, and the central hub may responsively update its stored operational state data to indicate the operational-failure state of the given device. In addition, this updated state information may propagate among other devices in the collection, which may update their stored operational data as well.

Alternatively, a given device could be configured to determine an operational failure of another device without the other device reporting to the given device that the other device has experienced the operational failure. A given device could do this, for instance, by itself monitoring operation of the other device and, based on that monitoring, discovering that the other device has experienced an operational failure.

One way to accomplish this is through monitoring of heartbeat signaling. For instance, each of various devices at the customer premises could be configured to transmit periodic heartbeat signaling messages to each other. A given device may therefore be configured to receive these heartbeat messages periodically from another device. Further, a processor of the given device could be configured to conclude that another device has experienced an operational failure based on the processor detecting that the given device has not received at least a predefined threshold number of such heartbeat messages in a row from the other device. This may happen when the other device loses its ability to communicate or experiences another operational failure that prevents the other device from transmitting heartbeat messages for instance.

Another way to accomplish this is through feedback signaling in relation to device control. For instance, a controlled device may be configured to transmit a feedback signal confirming that the controlled device successfully changes state when instructed to do so. Thus, when a controlling device transmits a control signal to change the operational state of a controlled device, the controlling device may expect to receive in response a feedback signal confirming that the operational state of the controlled device changed as requested. If the controlling device does not receive such a feedback signal, the controlling device may deem the absence of that feedback signal to be an indication that the controlled device has experienced an operational failure.

Still another way for a given device to determine that another device has experienced an operational failure is for the given device to receive notification from the other device that the other device has experienced the operational failure, or to receive such notification from one or more other devices.

Yet another way to accomplish this is through monitoring of one or more device-specific functions. For instance, a given device may have a light sensor configured to monitor a level of brightness, and the given device may apply that light sensor to evaluate a level of brightness when a nearby lightbulb is purportedly turned on. Detecting that the level of brightness in that scenario is at least as low as a threshold level may represent a determined operational failure of the lightbulb. Likewise, a given device may have an air-flow sensor configured to monitor a level of air flow, and the given device may apply that air-flor sensor to evaluate a level of air-flow when a nearby (or operationally nearby) air-conditioning unit is purportedly turned on. Detecting that the level of air-flow in that scenario is at least as low as a threshold level may represent a determined operational failure of the air-conditioning unit.

When a given device determines that another device has experienced an operational failure, the given device may update its own operational data accordingly and may report this updated state information to one or more other devices. For instance, if the given device is a member of a control group, the given device may report this updated state information to each other member of the control group, and each such other member of the control group may accordingly update its stored operational data to indicate this operational-failure state of the device that the given device deemed to have experienced the operational failure. Further, if a central hub is involved, the given device can likewise report this updated state information to the central hub, and the central hub may responsively update its stored operational state data to indicate this updated state of the device at issue. Moreover, this updated state information may likewise propagate from device to device, which may update their stored operational data as well.

In an example implementation, where a controlling device is set to control state of a first controlled device and is not set to control state of a second controlled device, and where the first controlled device experiences an operational failure, the system could be automatically reconfigured to have the controlling device be set to control state of the second controlled device instead of or in addition to controlling state of the first controlled device.

For instance, in a scenario where a switch is set to control the on/off state of a first lightbulb and is not set to control the on/off state of a second nearby lightbulb, and where the first lightbulb experiences an operational failure, the system could be automatically reconfigured to have the switch be set to control the on/off state of the second lightbulb instead of or in addition to controlling the on/off state of the first lightbulb. That way, when a user engages the switch to turn on light, the switch would usefully operate to turn on the second lightbulb instead of or in addition to turning on the first lightbulb, which may help to provide sufficient light in response to the user engaging the switch.

Likewise, in a scenario where thermostat or other controlling device is set to control the on/off state of an air-conditioning unit and is not set to control the on/off state of a nearby table fan (e.g., to control a smart outlet into which the nearby table fan is plugged), and where the air-conditioning unit experiences an operational failure, the system could be automatically reconfigured to have the controlling device be set to control the on/off state of the table fan instead of or in addition to controlling the on/off state of the air-conditioning unit. That way, when the controlling device seeks to cool the air (e.g., in response to user input or detecting of high ambient room temperature), the controlling device could usefully operate to turn on the floor-standing fan instead of or in addition to turning on the air-conditioning unit, which may help provide sufficient air flow in the area.

As noted above, this dynamic reconfiguration of the system could be carried out one by or more entities, such as but not limited to the controlling device, the first controlled device, and/or a central hub.

As one example, the reconfiguration could be carried out by the controlling device. For instance, the controlling device could determine that the first controlled device has experienced an operational failure, and the controlling device could responsively reconfigure itself to control the second controlled device instead of or in addition to controlling the first controlled device. That way, when the controlling device would engage in signaling to control state of the first controlled device, the controlling device could instead or additionally engage in signaling to control state of the second controlled device.

The act of the controlling device determining that the first controlled device has experienced the operational failure may occur at a time other than when the controlling device is seeking to control state of the first controlled device. In that case, the controlling device may store an indication that, when the controlling device would seek to control state of the first controlled device, the controlling device should control state of the second controlled device instead of or in addition to controlling state of the first controlled device. That way, when the controlling device encounters a trigger (e.g., user input, sensor notification, etc.) to engage in such control, the controlling device could responsively control state the second controlled device instead of or in addition to controlling state of the first controlled device.

Alternatively, the act of the controlling device determining that the first controlled device has experienced the operational failure may occur when the controlling device is seeking to control state of the first controlled device. For instance, when the controlling device encounters a trigger to control state to engage in such control, the controlling device may then determine (e.g., by reference to previously stored state data, or in another manner) that the first controlled device has experienced the operational failure, and the controlling device may responsively reconfigure itself on the fly to control state of the second controlled device instead of or in addition to controlling state of the first controlled device.

As another example, the reconfiguration could be carried out by the first controlled device (if that device is still able to do so). For instance, the first controlled device could determine that it has experienced an operational failure. And when the first controlled device receives a control command seeking to control state of the first controlled device, the first controlled device could respond cooperatively to that control command and to its determined operational failure by then triggering control of state of the second controlled device instead or in addition. For instance, the first controlled device could behave as a controlling device, sending a control command to the second controlled device to control state of the second controlled device.

The act of the first controlled device determining that it has experienced the operational failure may occur at a time other than when the controlling device is seeking to control state of the first controlled device. In that case, the first controlled device may store an indication that, when the first controlled device receives a control command seeking to control state of the first controlled device, the first controlled device should responsively control state of the second controlled device.

Alternatively, the act of first controlled device determining that it has experienced the operational failure may occur when the controlling device is seeking to control state of the first controlled device. For instance, when the first controlled device receives a control command seeking to control state of the first controlled device, the first controlled device may responsively reconfigure itself on the fly to control state of the second controlled device.

As yet another example, the reconfiguration could be carried out by a central hub (if present) that is configured to receive a control command from the controlling device and to respond to that control command by signaling to control a state of the first controlled device. The central hub may determine that the first controlled device has experienced an operational failure, and the central hub may then respond to that determined operational failure by reconfiguring itself to respond to the control command from the controlling device by signaling to control state of the second control device instead or in addition to responding to the control command by signaling to control state of the first controlled device.

The act of the central hub determining that the first controlled device has experienced the operational failure may occur at a time other than when the central hub is seeking to control state of the first controlled device. In that case, the central hub may store an indication that, when the central hub receives from the controlling device a control command seeking to control state of the first controlled device, the central hub should responsively control state of the second controlled device instead of or in addition to controlling state of the first controlled device.

Alternatively, the act of central hub determining that the first controlled device has experienced the operational failure may occur when the central hub is seeking to control state of the first controlled device. For instance, when the central hub receives from the controlling device a control command seeking to control state of the first controlled device, the central hub may responsively reconfigure itself on the fly to control state of the second controlled device instead of or in addition to controlling state of the first controlled device.

In these or other examples, to facilitate dynamically reconfiguring the system to facilitate controlling state of the second controlled device instead of or in addition to controlling state of the first controlled device, the processor that carried out the dynamic reconfiguration could have access to data that designates the second controlled device as a backup for the first controlled device. Thus, upon determining that the first controlled device has experienced an operational failure, the processor could refer to the data to determine that the second controlled device is the backup for the first controlled device, and, based on determining that the second controlled device is the backup for the first controlled device, the processor could reconfigure the system to have the controller control the second controlled device instead of having the controller control state of the first controlled device.

This data could be established by user input through a configuration interface. By way of example, using an interface like that shown in FIG. 3, the user may designate respectively for each of various controlled devices, a backup controlled device. Once the user provides this input, the computer 300 may then provision devices and any applicable central hub with control-group data as indicated above, and this control-group data could include each backup designation provided by the user.

Alternatively or additionally, this data could be established based on historical operational data. For instance, a processor could determine based on historical operational data that when a controlling device seeks to control state of a first controlled device and that effort fails, that failure has been followed by receipt of manual user input controlling state of the second controlled device. Based on this sequence of events, namely, the failure of controlling state of the first controlled device followed by the user input controlling state of the second controlled device, the processor could generate data that sets the second controlled device as a backup for the first controlled device. That way, a processor could then use the data as a basis engage in dynamic reconfiguration like that discussed above.

Figure 5:
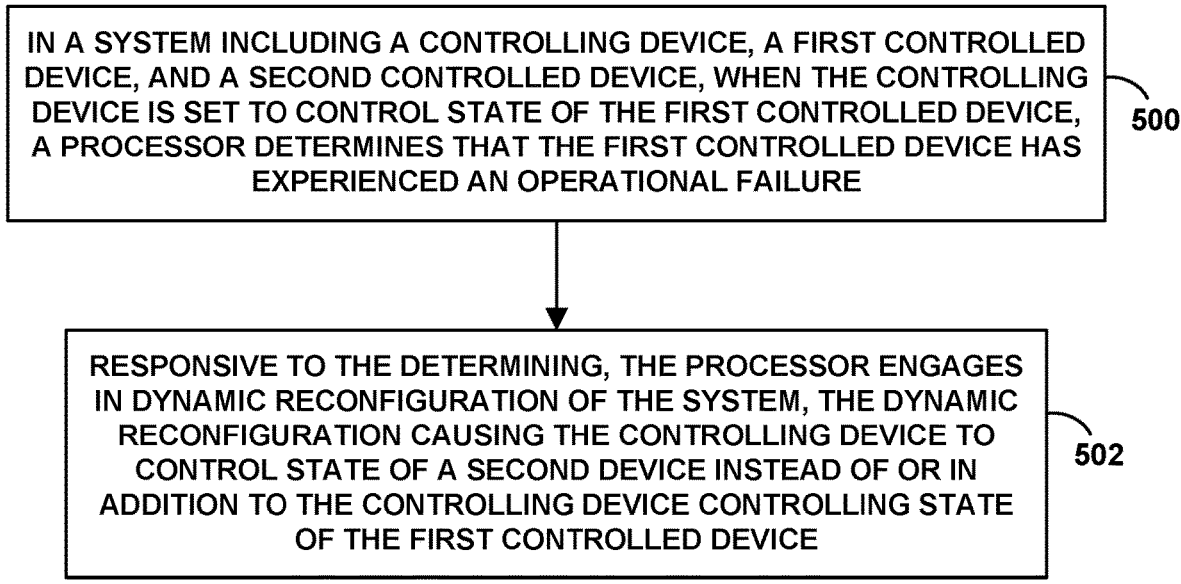
FIG. 5 is a flow chart illustrating an example method that could be carried out in accordance with the disclosure.

FIG. 5 is a flow chart illustrating an example method that could be carried out in accordance with the present disclosure to dynamically reconfigure control pairing in a system that includes a controlling device, a first controlled device and a second controlled device. As shown in FIG. 5, at block 500, the method includes, when the controlling device is set to control state of the first controlled device, a processor determining that the first controlled device has experienced an operational failure. Further, the method includes, at block 502, responsive to the determining, the processor engaging in dynamic reconfiguration of the system, the dynamic reconfiguration causing the controlling device to control state of a second device instead of or in addition to the controlling device controlling state of the first controlled device.

In line with the discussion above, the processor in this method could be in the controlling device, in which case, the dynamic reconfiguration may involve updating operational data in the controlling device to indicate that the controlling device is to control state of the second controlled device instead or in addition to controlling state of the first controlled device. Alternatively, the processor could be in the first controlled device, in which case the dynamic reconfiguration may involve updating operational data in the first controlled device to indicate that, when the first controlled device receives a first control command seeking to control state of the first controlled device, the first controlled device is to responsively send a second control command seeking to control state of the second controlled device. Still alternatively, the processor could be in a central hub that is configured to receive a control command from the controlling device and to respond to the control command by controlling state of the first controlled device, in which case the dynamic reconfiguration comprises updating operational data in the central hub to indicate that, when the central hub receives the control command, the central hub is to responsively control state of the second controlled device instead of or in addition to the central hub controlling state of the first controlled device.

As further discussed above, the dynamic reconfiguration causing the controlling device to control state of a second device instead of or in addition to the controlling device controlling state of the first controlled device could be based on a determination that the second controlled device is a backup for the first controlled device. For instance, the processor could refer to data that designates the second controlled device as a backup for the first controlled device.

As additionally discussed above, the operational failure of the first controlled device could comprise the first controlled device losing an ability to carry out a device-specific function.

Still further, as discussed above, in an example implementation, the first controlled device could be a first lightbulb and the second controlled device could be a second lightbulb. Alternatively, the first controlled device could be an air-conditioning unit, and the second controlled device could be a fan. Other examples are possible as well.

In line with the discussion above, a method such as this could also be carried out by a computing system, which could include at least one processor, at least one non-transitory data storage, and program instructions stored in the at least one non-transitory data storage and executable by the at least one processor to carry out the method operations, such as by causing the computing system to carry out the operations. Such a system could be disposed at the controlling device, at the first controlled device, at a central hub, or at another device, or the system could be provided as a standalone system.

Various other features described herein could be carried out in this context as well, and vice versa.

Further, the present disclosure also contemplates at least one non-transitory computer-readable medium (e.g., optical, magnetic, or flash storage media) encoded with, embodying, or otherwise storing program instructions executable by at least one processor to carry out various operations as described herein.

Exemplary embodiments have been described above. Those skilled in the art will understand, however, that changes and modifications may be made to these embodiments without departing from the true scope and spirit of the invention.

What is claimed is:

1. A method for dynamically reconfiguring control pairing in a system comprising a controlling device, a first controlled device, and a second controlled device, the method comprising:

determining by a processor, when the controlling device is set to control state of the first controlled device, that the first controlled device has experienced an operational failure; and responsive to the determining, engaging by the processor in dynamic reconfiguration of the system, the dynamic reconfiguration causing the controlling device to control state of a second device instead of or in addition to the controlling device controlling state of the first controlled device, wherein the processor is in the first controlled device, and wherein the dynamic reconfiguration comprises updating operational data in the first controlled device to indicate that, when the first controlled device receives a first control command seeking to control state of the first controlled device, the first controlled device is to responsively send a second control command seeking to control state of the second controlled device.

2. The method of claim 1, wherein engaging in the dynamic reconfiguration causing the controlling device to control state of a second device instead of or in addition to the controlling device controlling state of the first controlled device is based on a determination that the second controlled device is a backup for the first controlled device.

3. The method of claim 1, wherein the operational failure of the first controlled device comprises the first controlled device losing an ability to carry out a device-specific function.

4. The method of claim 1, wherein the first controlled device is a first lightbulb and wherein the second controlled device is a second lightbulb.

5. The method of claim 4, wherein the operational failure comprises the first lightbulb having experienced a level of luminous decay that is at least as great as a predefined threshold level of luminous decay.

6. The method of claim 1, wherein the first controlled device is an air-conditioning unit and wherein the second controlled device is a fan.

7. A computing system for dynamically reconfiguring control pairing, the computing system comprising:

at least one processor;

at least one non-transitory data storage; and program instructions stored in the at least one non-transitory data storage and executable by the at least one processor to carry out operations including:

determining, when a controlling device is set to control state of a first controlled device, that the first controlled device has experienced an operational failure, and responsive to the determining, engaging in dynamic reconfiguration, the dynamic reconfiguration causing the controlling device to control state of a second device instead of or in addition to the controlling device controlling state of the first controlled device, wherein the computing system is disposed at the first controlled device, and wherein the dynamic reconfiguration comprises updating operational data in the first controlled device to indicate that, when the first controlled device receives a first control command seeking to control state of the first controlled device, the first controlled device is to responsively send a second control command seeking to control state of the second controlled device.

8. The computing system of claim 7, wherein engaging in the dynamic reconfiguration causing the controlling device to control state of a second device instead of or in addition to the controlling device controlling state of the first controlled device is based on a determination that the second controlled device is a backup for the first controlled device.

9. The computing system of claim 7, wherein the operational failure of the first controlled device comprises the first controlled device losing an ability to carry out a device-specific function.

10. At least one non-transitory computer-readable medium, having stored thereon program instructions executable by at least one processor to carry out operations comprising:
- determining, when a controlling device is set to control state of a first controlled device, that the first controlled device has experienced an operational failure; and
- responsive to the determining, engaging in dynamic reconfiguration, the dynamic reconfiguration causing the controlling device to control state of a second device instead of or in addition to the controlling device controlling state of the first controlled device,
- wherein the at least one non-transitory computer-readable medium is disposed at the first controlled device, and wherein the dynamic reconfiguration comprises updating operational data in the first controlled device to indicate that, when the first controlled device receives a first control command seeking to control state of the first controlled device, the first controlled device is to responsively send a second control command seeking to control state of the second controlled device.

11. The at least one non-transitory computer-readable medium of claim 10, wherein engaging in the dynamic reconfiguration causing the controlling device to control state of a second device instead of or in addition to the controlling device controlling state of the first controlled device is based on a determination that the second controlled device is a backup for the first controlled device.

12. The at least one non-transitory computer-readable medium of claim 10, wherein the operational failure of the first controlled device comprises the first controlled device losing an ability to carry out a device-specific function.

13. The at least one non-transitory computer-readable medium of claim 10, wherein the first controlled device is a first lightbulb and wherein the second controlled device is a second lightbulb.

14. The at least one non-transitory computer-readable medium of claim 13, wherein the operational failure comprises the first lightbulb having experienced a level of luminous decay that is at least as great as a predefined threshold level of luminous decay.

15. The at least one non-transitory computer-readable medium of claim 10, wherein the first controlled device is an air-conditioning unit and wherein the second controlled device is a fan.

16. The at least one non-transitory computer-readable medium of claim 15, wherein the operational failure comprises the air-conditioning unit failing to output at least a predefined threshold level of air flow compared with an air-flow setting of the air-conditioning unit.

17. The computing system of claim 7, wherein the first controlled device is a first lightbulb and wherein the second controlled device is a second lightbulb.

18. The computing system of claim 17, wherein the operational failure comprises the first lightbulb having experienced a level of luminous decay that is at least as great as a predefined threshold level of luminous decay.

19. The computing system of claim 7, wherein the first controlled device is an air-conditioning unit and wherein the second controlled device is a fan.

20. The computing system of claim 19, wherein the operational failure comprises the air-conditioning unit failing to output at least a predefined threshold level of air flow compared with an air-flow setting of the air-conditioning unit.

* * * * *